United States Patent [19]

Ha

[11] Patent Number: 4,590,406

[45] Date of Patent: May 20, 1986

[54] AUTOMATIC BRAKE CONTROL SYSTEM

[75] Inventor: Jung Y. Ha, Seoul, Rep. of Korea

[73] Assignee: Kia Industrial Co., Ltd., Seoul, Rep. of Korea

[21] Appl. No.: 636,407

[22] Filed: Jul. 31, 1984

[51] Int. Cl.$^4$ .................. B60Q 1/26; F16D 23/00
[52] U.S. Cl. ..................... 315/80; 192/3 H; 192/3 T; 192/0.094; 315/82
[58] Field of Search .......... 307/10 R, 10 CS; 315/80, 82; 192/3 H, 0.094, 12 R, 12 C, 3 T, 3 H

[56] References Cited

U.S. PATENT DOCUMENTS

| | | | |
|---|---|---|---|
| 2,555,919 | 6/1951 | Cook | 315/80 |
| 2,902,119 | 9/1959 | Gates | 192/3 H |
| 4,518,067 | 5/1985 | Jow et al. | 192/3 H |

Primary Examiner—Harold Dixon
Attorney, Agent, or Firm—Birch, Stewart, Kolasch & Birch

[57] ABSTRACT

An automatic braking control system is capable of automatically maintaining a braking force once a vehicle has been stopped by the driver. The braking force is maintained until the clutch of the vehicle is engaged, at which time the force is automatically released so that the vehicle can be restarted. This system is especially useful for restarting a vehicle which has been stopped on an upward slope. In such a situation, the vehicle is prevented from rolling backwards, as commonly occurs when attempting to resume motion up the slope. The system is also capable of automatically turning off head lights of the vehicle when the vehicle is stopped in order to conserve battery power.

10 Claims, 3 Drawing Figures

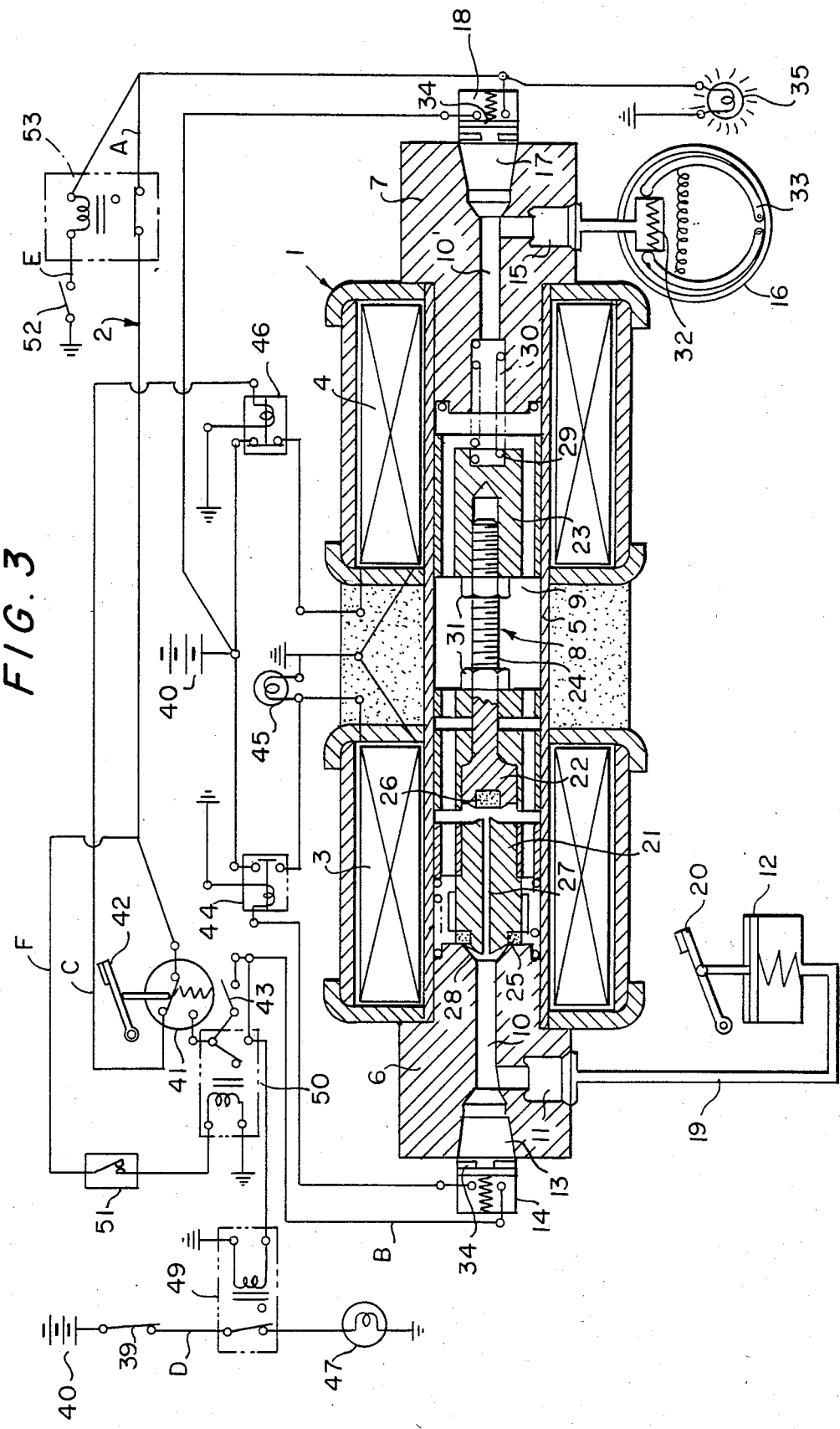

AUTOMATIC BRAKE CONTROL SYSTEM

FIELD OF THE INVENTION

This invention relates to an automatic brake control system, and in particular to a new brake control system useful for restarting a car after stopping. The system is especially suited to avoid an accident which can occur when restarting on a slope. The system utilizes a hydraulic check valve and an electric circuit to control the fluid flow in the brake system.

BACKGROUND OF THE INVENTION

Typically, when a car is driven in an ordinary manner, to stop the car both a brake pedal and a clutch pedal must be depressed. When restarting the car after stopping, one must release the brake pedal, press the accelerator pedal and at the same time slowly release the clutch pedal.

After parking a car, one must release a parking brake, then release the brake pedal and at the same time press the accelerator pedal and slowly release the clutch pedal.

When the car is to be driven on an upward slope, when restarting the car after stopping, one selects a low-gear before releasing the parking brake pedal, at the same pressing the accelerator and releasing the clutch pedal to start the car. At this time if the clutch pedal is released too quickly, the engine will stall. If the clutch is released too slowly, the car will slip backward which may cause the car to come into contact with another car behind it. It therefore requires great skill to master this driving technique.

Additionally, at night, the head lamps are not always required to be turned on when the car is stopped. However, head lamps are usually continuously connected with the battery once they are turned on so that there may be a great waste of energy.

SUMMARY OF THE INVENTION

A primary object of the present invention is to provide an automatic brake control system which opens and closes the passage for flow of the brake oil between the brake master cylinder and the cylinder of the brake drum. Such a system may comprise a check valve responsive to energizing and deenergizing a solenoid coil which is associated with the check valve body and which is easily operated. The system controls the car properly under all circumstances.

It is another object of the present invention to provide an automatic brake control system which prevents movement of a car on roads of any slope after stopping the car by pressing the brake pedal and clutch pedal and releasing the brake pedal. When restarting the car thus stopped, pressing the accelerator and at the same time releasing the clutch pedal slowly, the car is permitted to restart from a standstill.

It is a further object of this invention to provide an automatic brake control system which can turn the head lamps on when the car is moving at night and automatically turn the head lamps off when the car is stopped.

In accordance with the above objects of the present invention, there is provided an automatic brake control system comprising a check valve body including a cylindrical case, a main check valve, a sub-check valve, a plunger and two plugs which are respectively connected with a brake master cylinder and a brake drum; an inlet solenoid coil and an outlet solenoid coil which are mounted around the outside ends of the cylindrical case for energizing the check valve for controlling the flow of the brake oil by opening and closing the oil passage; and an electric circuit for supplying electric power to the solenoid coils and for turning the head lamps on or off by sensing the revolution of a wheel of the car.

The check valve body for controlling the flow of brake oil is connected to a brake master cylinder and a brake drum through the plugs which are inserted into the respective ends of the cylindrical case. The main check valve, the sub-check valve and the plunger are located within the cylindrical case. The sub-check valve and the plunger are connected to each other by a threaded shaft and the main-check valve is separate therefrom in the cylindrical case. The main-check valve has an aperture through which the oil in the cylindrical case and in the brake drum can return to the master cylinder upon application of magnetic forces by the solenoid coils. The plugs inserted into the cylindrical case at the ends thereof each have a channel for brake oil, a connector for connecting with the master cylinder or a brake drum, and a connector for a contact switch which is operated by the hydraulic pressure.

The electric circuit connects the contact switches on the plugs and the solenoid coils with the battery through a relay and a microswitch which is associated with the clutch pedal so that the microswitch alternately directs the current flow supplied from the battery to the inlet solenoid coil or the outlet solenoid coil.

Furthermore, the electric circuit is connected to the head lamp line which has a relay, a brake switch, a revolution sensor for a wheel and another relay, and is connected to the parking brake line which has a parking brake switch and a relay.

Therefore, upon pressing the brake pedal associated with the master cylinder, the brake oil in the master cylinder flows into the brake drum through the oil channel of the inlet plug, the inner space of the cylindrical case and the oil channel of the outlet plug. As the clutch pedal is pressed which actuates the associated microswitch, the inlet solenoid coil on the inlet end of the cylindrical case is energized by the electric current supplied from the battery. The energized inlet solenoid coil draws the check valve up to the seat of the inlet plug to close the oil passage so that the pressure within the brake drum is maintained as long as the clutch pedal remains pressed.

When parking the car, after pressing the brake pedal and the clutch pedal in due sequence and engaging the parking brake, the relay of the parking brake line is energized and opens the electric line which connects the inlet solenoid coil with the battery through the outlet contact switch and the microswitch of the clutch pedal so that the inlet solenoid coil is de-energized with the check valve closing the oil passage. Upon release of the clutch pedal, the braking force is maintained because the hydraulic pressure on the master cylinder side is lower than that of the brake drum. Thus, the check valve is pushed toward the seat of the inlet side plug so that the oil passage is tightly closed.

Upon releasing the clutch pedal, the microswitch directs the current to the outlet solenoid coil, and the outlet solenoid coil is energized. The energized outlet solenoid coil draws the plunger and the connected sub-check valve, but not the main-check valve. The oil in the inner space of the cylindrical case and in the brake drum returns to the master cylinder through the aperture of the main check valve.

At night, when the head lamps are turned on, the revolution sensor senses the motion of the car. When the car moves, the revolution sensor connects the head lamp line. When the car is still, the revolution sensor opens the line.

Finally, it should be noted that, with the above-mentioned system, an automatic brake control system does the conventional work of the clutch pedal and the brake pedal to stop the car. Whenever the braking effort of the system is inadequate, by pressing the brake pedal manually, the braking effort can be increased by supplying the oil under greater pressure to the brake drum.

Further features and advantages will be apparent from the detailed description below of a system according to the invention with reference to the attached drawings set forth by way of example, not limitatively.

BRIEF DESCRIPTION OF THE DRAWINGS

FIG. 1 shows a cross-sectional view of an automatic brake control system in accordance with the present invention in a normal condition wherein both a clutch pedal and a brake pedal are operated, and when the head lamp line is on.

FIG. 3 shows a cross-sectional view of a system in accordance with the present invention when releasing the clutch pedal, a channel for oil being opened to release the brake drum.

DESCRIPTION OF THE PREFERRED EMBODIMENT

Figure 1:
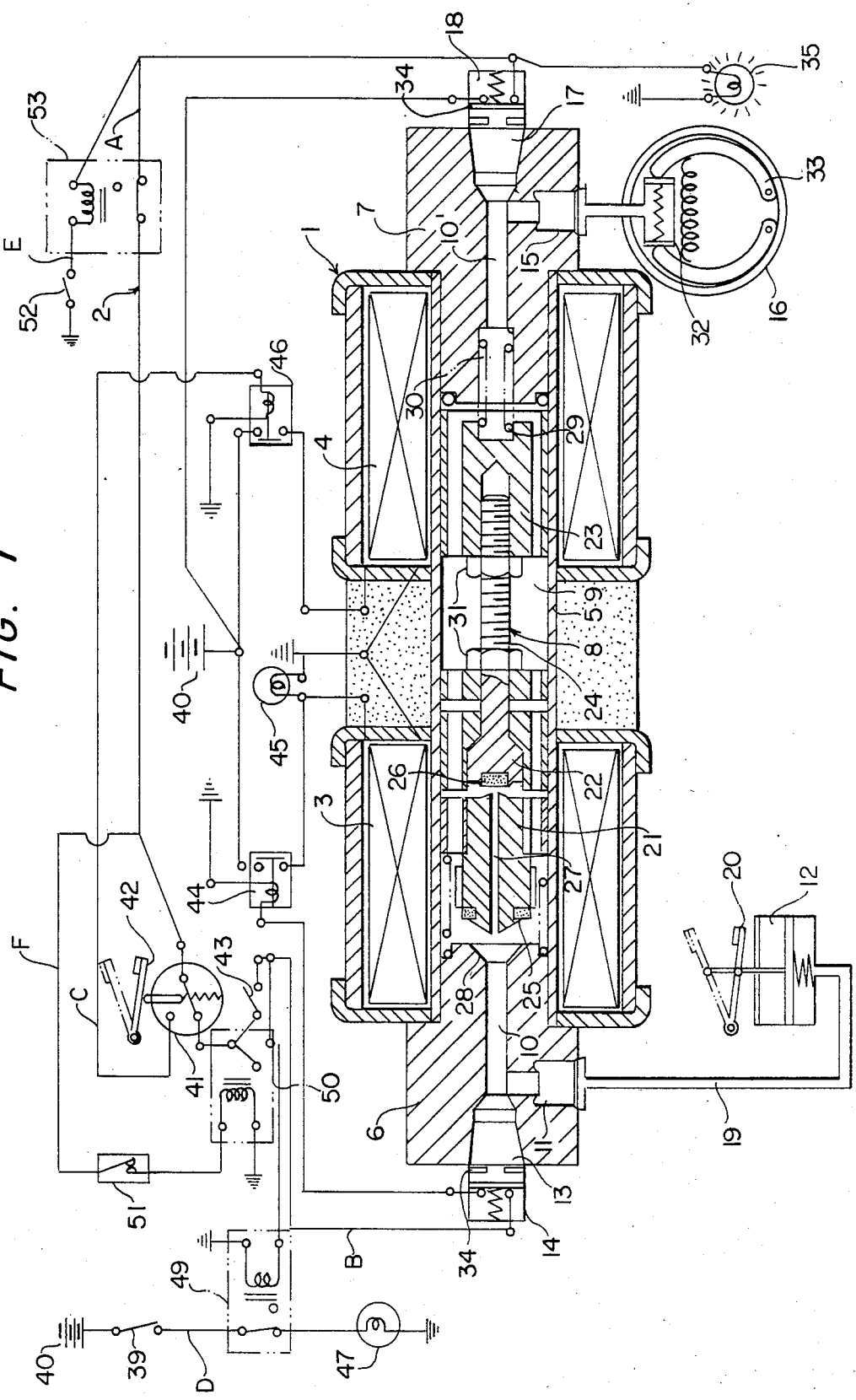
Figure 2:
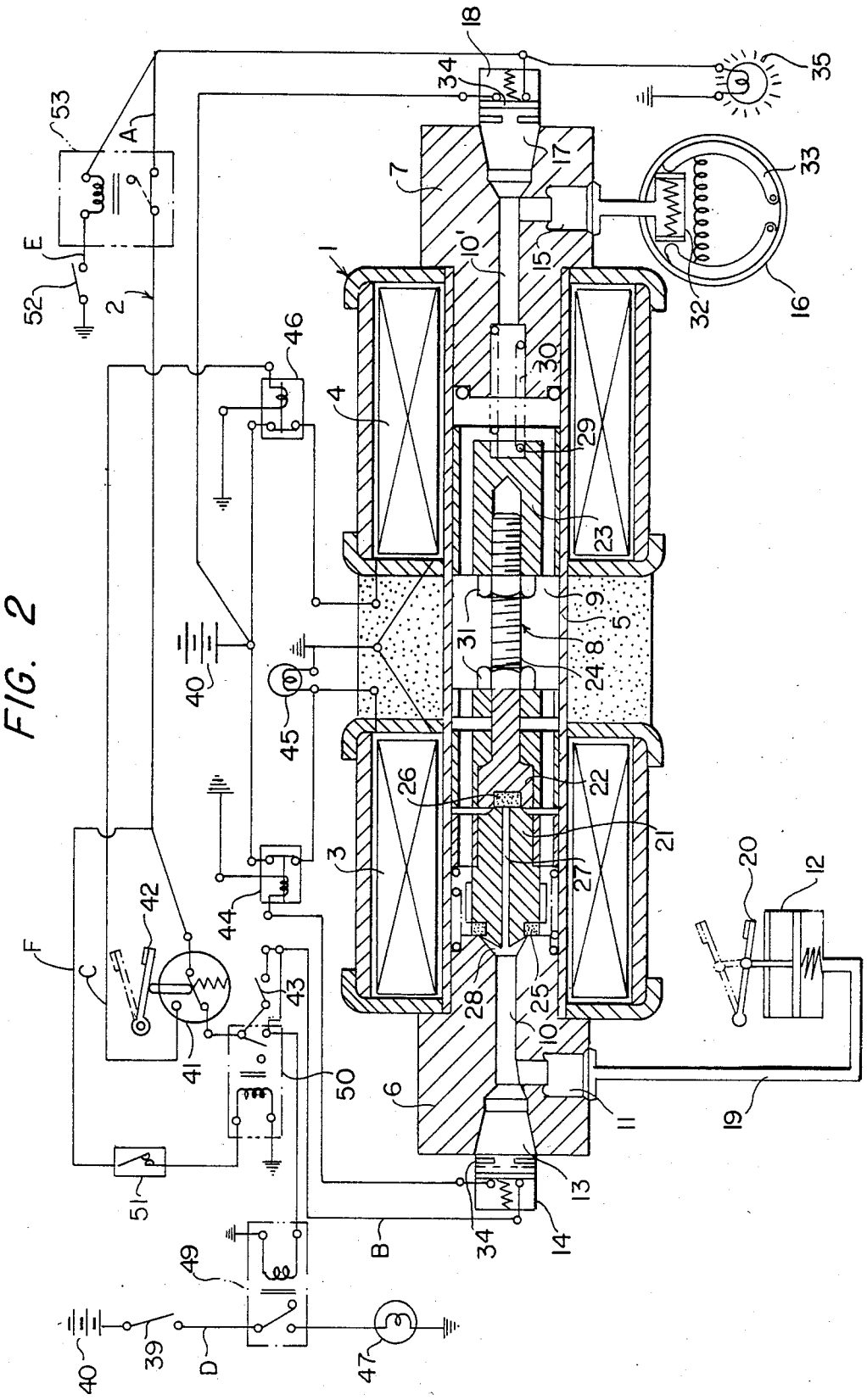
FIG. 2 shows a cross-sectional view of an automatic brake control system in accordance with the present invention when releasing only the brake pedal after pressing the clutch pedal and the brake pedal, and when the head lamp line is open.

Referring to FIGS. 1 through 3, there is illustrated an automatic brake control system which includes generally a control valve 1 and an electric circuit.

The valve 1 comprises two solenoid coils 3, 4 which are mounted on each end of the outside of the cylindrical case 5, two plugs 6, 7 which are partially inserted into each end of the cylindrical case 5 and a seal rod 8 positioned within the inner space of the cylindrical case 5 and located between the plugs 6, 7.

The inlet plug 6 has a longitudinal oil channel 10, a connecting hole 11 for brake master cylinder 12, and a switch hole 13 for inlet contact switch 14. The outlet plug 7 has a longitudinal oil channel 10', a connecting hole 15 for brake drum 16, and switch hole 17 for outlet contact switch 18.

The cylinder connecting hole 11 of the plug 6 is connected to a brake master cylinder 12 through a tube 19. The inlet contact switch hole 13 carries a contact switch 14 which is operated by hydraulic pressure in the oil channel 10. The master cylinder 12 stores the oil and is operated by the brake pedal 20. The drum connecting hole 15 of the plug 7 is connected to the brake drum 16 and the outlet contact switch hole 17 carries a brake switch 18 which is also operated by hydraulic pressure in the oil channel 10'.

In the inner space 9 of the valve body, there is a seal rod 8 which is comprised of a main check valve 21 and a sub-check valve 22 which is connected to a plunger 23 through a threaded connecting rod 24. A seal member 25 is mounted on the periphery of one end of the main check valve 21. A packing member 26 is also mounted in the center portion of the sub-check valve 22. The main check valve 21 has an aperture 27 extending axially thereof from one end to the other. The inside end of the plug 6 has a seat 28 suitable for accepting the end of the main check valve 21 to close tightly the oil channel 10 with the seal member 25.

A spring 29 is located between the outlet plug 7 and the plunger 23. In the inside end of the plug 7 and the outside end of the plunger 23 are formed holes 30 for retaining the spring 29. The length of the seal rod 8 can be adjusted by the nuts 31 on the threaded connecting rod 24.

The electric circuit 2 comprises several electric current lines. The common line "A" includes a battery 40, the contact switch 18 and a limit switch 41 which is operated by the clutch pedal 42. The first line "B" is for energizing the inlet solenoid coil 3 and comprises limit switch 41, a switch 43, the inlet contact switch 14, a first relay 44 and an operating lamp 45, which forms a series circuit from a battery 40 to the inlet solenoid coil 3. The second line "C" is for energizing the outlet solenoid coil 4 and comprises a second relay 46, which forms a series circuit from the battery 40 to the outlet solenoid coil 4. The third line "D" is for supplying current to the head lamp 47 and comprises a switch 39, a third relay 49 which can be operated manually, a fourth relay 50 which is connected to the line "B" and a revolution sensor 51 to sense the motion of the car. The third line "D" forms a series circuit from the battery 40 to the head lamp 47 and is connected to the line "A" through the third and fourth relays 49, 50 and the revolution sensor 51. Finally, the fourth line "E" is composed of a parking brake switch 52 which is operated by a parking brake (not shown), and a fifth relay 53 which is connected to the line "A". The current operating the line "E" is supplied from the line "A".

The inlet solenoid coil 3 and the outlet solenoid coil 4 are directly connected to the battery through the relays 44 and 46, respectively. The relays are energized to close either circuit to connect one of the solenoid coils with the battery by an electric signal supplied from the battery through one of the other electric lines "B" or "C".

OPERATION

The operation of the above-described embodiment according to this invention will be described with reference to the drawings. It is presumed that the seal rod 8 is initially unseated from the seat 28 of the inlet plug 6, separated from the inlet plug 6 and from the outlet plug 7, as seen in FIG. 1. In this position of the seal rod 8, oil flows freely from the master cylinder 12 to the brake drum 16 because the oil passage is open. The solenoid coils 3 and 4 are not energized. This position of the seal rod 8 is the normal condition. If the brake pedal 20 is pressed, the oil in the master cylinder 12 will flow to the brake drum 16 through the inner space 9 of the cylindrical case 5. The oil will fill a hydraulic cylinder 32 in the brake drum 16, which presses a lining 33 toward the inner wall of the brake drum 16 so that the wheel can be stopped in a well known manner. As a result of pressing the brake pedal 20, the pressurized oil in the channels 10 and 10' pushes the plates 34 onto the contact points in the contact switches 14 and 18, so the electric circuits are closed and made. The brake oil in the master cylinder 12 flows into the brake drum 16 through the oil channel 10 of the inlet plug 6, the inner space 9 of the cylindrical case 5 and the oil channel 10' of the outlet plug 7.

Upon pressing the clutch pedal 42, thereby actuating the microswitch 41, the microswitch 41 connects the common line "A" with the line "B". The electric current can be supplied from the battery 40 to the inlet solenoid coil 3 when the current through the outlet contact switch 18, microswitch 41, fourth relay 50 or switch 43, inlet contact switch 14 and the first relay 44 closes the relay 44. The inlet solenoid coil 3 on the inlet end of the cylindrical case 5 is energized by the electric current directly supplied from the battery 40 through the first relay 44. The energized inlet solenoid coil 3 draws the seal rod 8 up to the seat 28 of the inlet plug 6 to close the oil passage as shown in FIG. 2 so that the braking force in the brake drum 16 can be maintained as long as the clutch pedal 42 is pressed.

If, for example, the car is on a slope and the automatic braking effect is insufficient, the braking force can be supplemented by additionally pressing the brake pedal 20 manually.

When parking the car, after having pressed the brake pedal 20 and the clutch pedal 42 in due sequence, the parking brake (not shown) is engaged, actuating the park switch 52 in line "E". The fifth relay 53 of parking brake line "E", is energized, thereby opening the common line "A". The inlet solenoid coil 3 is thus deenergized in the state wherein the seal rod 8 closes the oil passage. Upon releasing the clutch pedal 42, the braking force is maintained because the hydraulic pressure in the master cylinder 12 is lower than that in the brake drum 16, causing the seal rod 8 to be pushed against the seat 28 of the inlet plug 6 by the high hydraulic pressure on the brake drum 16 side and the force of spring 29. The oil passage is thus maintained tightly closed.

On the other hand, if restarting motion of the car after temporary stopping during driving the car or after parking, upon releasing the clutch pedal 42, the microswitch 41 opens line "B" and closes line "C". The electric current supplied from the battery 40 through line "C" energizes the second relay 46 and completes the circuit through the outlet solenoid coil 4. The outlet solenoid coil 4 is therefore energized by the electric current supplied from battery 40 directly.

The energized solenoid coil 4 attracts the plunger 23 which is connected to the sub-check valve 22 via the threaded shaft 24, but not to the main check valve 21. Since the hydraulic pressure acting on the plug 6, i.e., the closing force acting between the seat 28 of the plug 6 and the seal member 25 mounted on the main check valve 21, is a relatively great force, the relatively light electro-magnetic force of the outlet solenoid coil 4 cannot attract the entire seal rod 8. But because the diameter of aperture 27 formed in the main check valve is much smaller than that of the oil channel 10, the closing force acting between the other side of the main check valve 21 and the packing member 26 mounted on the sub-check valve 22 is very low. The energizing solenoid coil 4 can therefore draw the plunger 23 and separate the sub-check valve 22 from the main check valve 21, allowing the oil in the inner space 9 of the cylindrical case 5 and the oil in the brake drum 16 to return to the master cylinder 12 through the aperture 27 and the oil channel 10, as shown in FIG. 3.

When pressing the brake pedal 20 again, the main check valve 21 is separated from the seat 28 by the brake oil supplied from the master cylinder 12.

The revolution sensor 51 senses the rotation of a wheel of the car. When the wheel of the car is stopped the sensor switch opens the line "F", and when the car is moving the sensor switch closes the line "F". Thus, when the car is moving, Line "F" energizes the fourth relay 50 which is connected to the line "B" and opens the line "B". Therefore, when the car is moving, if the clutch pedal 41 and the brake pedal 20 are pressed, the inlet solenoid coil 3 is not energized and the automatic braking effect cannot be supplied to the brake drum 16. To selectively actuate the automatic braking when moving the switch 43 of the line "B" may be operated manually.

Also when the car is moving and sensor switch 51 closes line "F", relay 50 is energized, and relay 49 is therefore de-energized. Line "D" therefore remains closed to operate head lamp 47. But when the car is stopped, the sensor switch opens line "F" the fourth relay 50 is de-energized and the third relay 49 is energized and the head lamp line "D" is opened to turn off the head lamp 47. The third relay 49 can be alternatively operated manually to override the automatic cut-off of the head lamp, if necessary.

As described above, the brake system in accordance with the present invention can effectively brake the car in any circumstance, and is especially adapted to assist in restarting a stopped car, particularly when stopped or parked on a slope. Furthermore it is only necessary to press the brake pedal and the clutch pedal together in a normal fashion when stopping a car in order to operate the system. After pressing the brake pedal and the clutch pedal, upon releasing the brake pedal and only pressing the clutch pedal, the braking effect of the system is maintained. A brake system according to the invention can be easily operated and will enable a beginner driver to easily stop and restart a car even on a steep slope.

When the head lamp is turned on and the car is moving, the head lamp automatically remains turned on. When the car is stopped, the head lamp is automatically turned off by the system. A manual override permits the head lamp to remain on constantly in a conventional manner, if desired.

I claim:

1. An automatic brake control system for a vehicle comprising:
   a casing defining a braking oil passage;
   valve means within said casing for controlling the flow of braking oil, said valve means comprising a main check valve and a sub-check valve for sealing said oil passage;
   first and second solenoid coils mounted at opposite ends of said casing for selectively operating said valve means; and
   electric circuit means for selectively energizing said coils.

2. The system of claim 1, further comprising
   a brake master cylinder in fluid communication with one end of said oil passage; and
   braking means in fluid communication with the other end of said oil passage.

3. The system of claim 1 wherein
   said main check valve and said sub-check valve are freely movable with respect to each other;
   said main check valve is positioned generally adjacent a first of said coils to be attracted thereby when said first coil is energized;

said valve means further comprises a plunger connected to said sub-check valve, said plunger being generally adjacent a second of said coils to be attracted thereby when said second coil is energized.

4. The system of claim 3, wherein said main check valve comprises an aperture therethrough for permitting fluid passage through said main check valve.

5. The system of claim 3, wherein said plunger is adjustably connected to said sub-check valve.

6. The system of claim 1, further comprising means for automatically turning off head lamps of the vehicle when the vehicle is stopped.

7. The system of claim 1, further comprising disabling means for disabling said automatic brake control system when the vehicle is moving.

8. The system of claim 7, further comprising means responsive to said disabling means for automatically turning off head lamps of the vehicle when the vehicle is stopped.

9. The system of claim 1, wherein said electric circuit means comprise:
   a common power supply line;
   first and second solenoid lines connected to said first and second solenoid coils, respectively;
   a switch common to said first and second solenoid lines;
   a head lamp line;
   a motion sensor connected to said head lamp line for turning off a head lamp of the vehicle when the vehicle is stopped and connected to said first solenoid line for disabling the automatic brake control system; and
   a parking brake line for fixing said automatic braking system in engaged condition upon parking of the vehicle.

10. The system of claim 9 wherein said switch is associated with a clutch means of the vehicle and is actuated by operation of the clutch to provide energy selectively to said first or second solenoid line.

* * * * *